Oct. 14, 1969 G. R. WAMBOLDT 3,471,972
FRICTION PIVOT FOR PHONOGRAPH TRAY
Filed Feb. 2, 1968
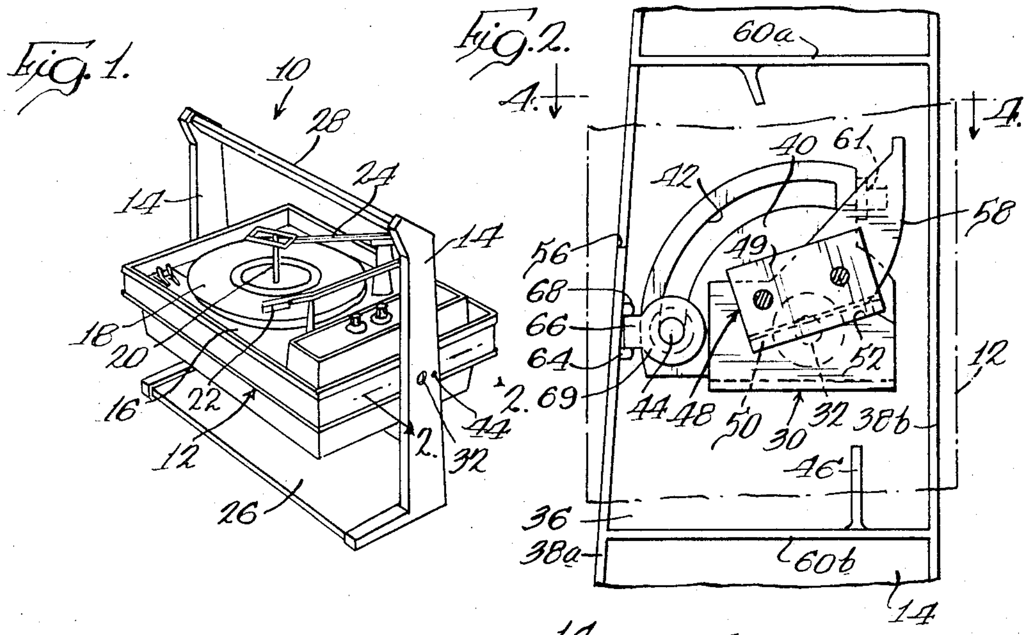
Fig. 1, Fig. 2.
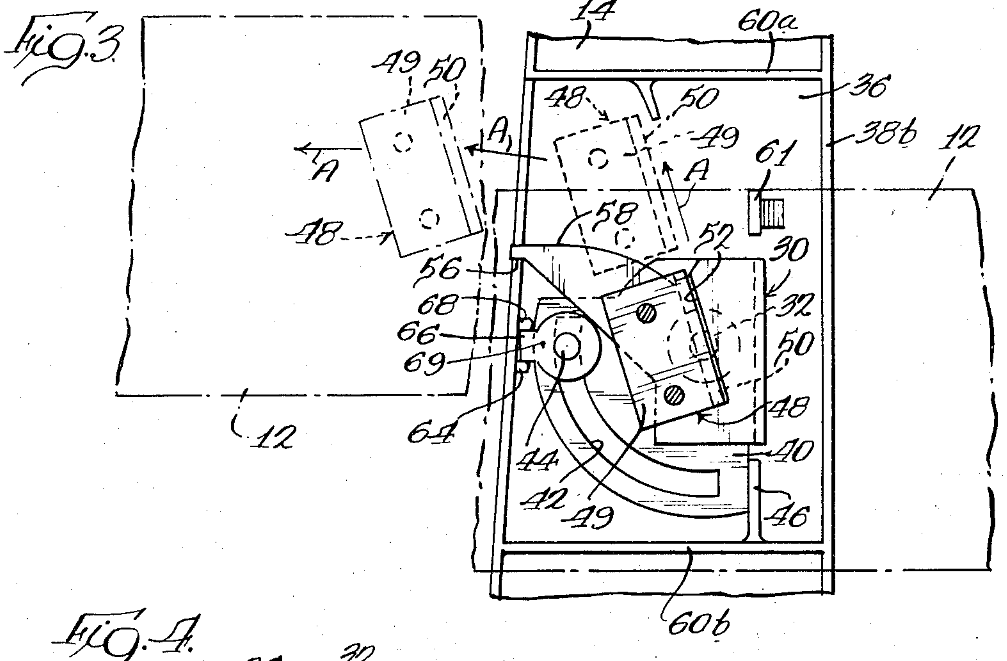
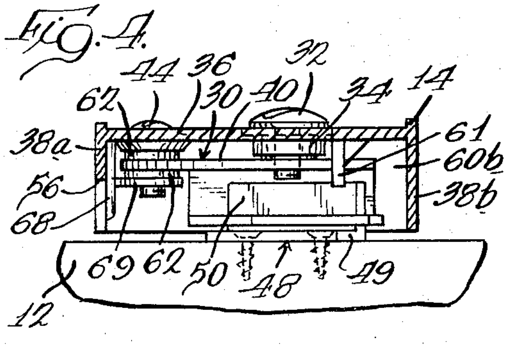
Inventor
Gary R. Wamboldt
By Hofgren, Wegner,
Allen, Stellman & McCord,
Attys United States Patent Office 3,471,972

Patented Oct. 14, 1969

3,471,972

FRICTION PIVOT FOR PHONOGRAPH TRAY

Gary R. Wamboldt, Chicago, Ill., assignor to Warwick Electronics Inc., a corporation of Delaware Filed Feb. 2, 1968, Ser. No. 702,583
Int. Cl. A47b 81/06
U.S. Cl. 312—8 11 Claims

ABSTRACT OF THE DISCLOSURE

A phonograph having a hinge structure, in which a record changer is pivotally mounted between a pair of spaced upright frame members for movement 90° between horizontal and vertical positions. A pivot bracket is secured to at least one of the upright frame members and a connecting bracket is secured to the side of the record changer in position for cooperating with the pivot bracket. Means are provided on the pivot bracket for removably receiving the connecting bracket and the record changer secured thereto to permit the connecting bracket and the record changer to be pivoted with the pivot bracket in relation to the upright frame member. A portion of the upright frame member prevents removal of the record changer except when the record changer is in its horizontal position.

BACKGROUND OF THE INVENTION

In the recent trend to portable high fidelity and stereophonic phonographs, a popular type of construction is a component-styled portable system wherein the record changer, its supporting stand, and/or the various speakers of the system can be used as a one-piece portable unit or can be taken apart like a component system. In many of these constructions, the record changer or tray member is pivotally mounted between a pair of upright frame members for movement between a vertical or storage position and a horizontal or playing position. This invention relates to a hinge structure for pivotally mounting the record changer to the upright frame.

SUMMARY OF THE INVENTION

An object of this invention is to provide a new and improved hinge structure for pivotally mounting, in a phonograph unit, a record changer between a pair of spaced upright frame members for movement between vertical and horizontal positions.

Another object of this invention is to provide a phonograph having a hinge structure as set forth in the preceding paragraph in which the hinge structure includes a pivot bracket secured to at least one of the upright frame members and a connecting bracket secured to the side of the record changer to permit the record changer to be removably mounted between the upright frame members for movement between its vertical and horizontal positions, with means for preventing removal of the record changer from between the upright frame members except when the tray is in its horizontal position.

A further object of this invention is to provide a phonograph having a hinge structure of the character described which includes an adjustable friction clamp mounted on the upright frame member and frictionally clamping the pivot bracket to slow the movement of the record changer and thereby prevent any jolting of the record changer when moved between its vertical and horizontal positions.

DESCRIPTION OF THE DRAWINGS

FIGURE 1 is a perspective view of a phonograph structure embodying the invention;

FIG. 2 is an elevational view taken generally in the direction of line 2—2 in FIG. 1, with the components of the hinge structure of this invention in their relative positions when the record changer is in its vertical position;

FIG. 3 is an elevational view similar to that of FIG. 2 with the components of the hinge structure in their relative positions when the record changer is in its horizontal position, and showing schematically the removal of the record changer; and FIG. 4 is a sectional view taken generally along the line 4—4 in FIG. 2.

DETAILED DESCRIPTION OF THE INVENTION

Referring to the drawings in detail, and particularly to FIG. 1, there is shown a phonograph construction generally designated 10, comprising a record changer in a tray member generally designated 12 and a supporting framework which includes a pair of spaced upright frame members 14 between which the record changer 12 is pivotally mounted for movement between a vertical or storage position and a horizontal or playing position (FIG. 1). The record changer is of standard construction and includes a motorboard 16, carrying a turntable 18. A spindle 20 extends upwardly from the turntable 18 in the usual manner, for centering records and positioning them in the desired relationship with turntable 18. A tone arm 22 is provided for playing of a record. The record changer 12 shown is an automatic record changer type, and employs a record balancing arm 24.

The upright frame members 14 are supported on a flat base 26, and a horizontal brace member 28 extends between the upper ends of the upright frame members to stabilize the frame members and maintain proper spacing therebetween for the record changer 12.

The hinge structure of this invention permits the record changer 12 to be removably mounted between the upright frame members 14 for pivotal movement between the storage and playing positions of the changer. The components of one hinge structure are shown in FIGS. 2 through 4, with the components shown in their relative positions in FIG. 2 when the record changer is in its vertical storage position and in FIG. 3 when the record changer is in its horizontal playing position. Means hereinafter described prevents removal of the record changer from between the upright frame members 14 except in the horizontal position.

More particularly, each hinge structure includes a pivot bracket, generally designated 30, which is pivotally secured to the upright frame member by a pivot screw 32 (FIG. 4), with a nylon bushing 34 disposed between the pivot bracket and a wall 36 of the upright frame member 14. At this point it should be noted that the upright frame members 14 are constructed in the form of an inwardly facing channel having a pair of parallel leg portions **38*a*, 38*b* with the wall 36 forming the bight portion of the channel. The pivot bracket 30** is disposed wholly within the channel formed by the upright frame member.

The pivot bracket 30 is generally U-shaped and has a flat plate portion 40 engaging the bushing 45. The plate portion 40 has an arcuate slot 42 concentric with the pivot screw 32. A pin or screw 44 extends through the wall 36 of the upright frame member 14 and through the slot 42 in the plate portion 40 of the pivot bracket 30. The pin 44 engages one end of the slot 42 to limit the pivoting movement of the pivot bracket 30 and define the vertical position of the record changer 12 when connected to the pivot bracket 30, as will be described in more detail hereinafter. A stop plate 46 engages the edge of the flat plate 40 of the pivot bracket 30 adjacent the other end of slot 42, as seen in FIG. 3, and defines the horizontal position of the record changer 12.

An L-shaped connecting bracket, generally designated 48 and having legs 49 and 50, is secured to the side wall of the record changer 12 in position for cooperating with the pivot bracket 30 to removably connect the record changer 12 to the pivot bracket. One leg 49 of the L-shaped connecting bracket 48 is screwed to the side wall of the record changer 12, as seen in FIG. 4, and the other leg 50 forms a tongue which is received in an open-ended slot 52 in the pivot bracket 30. The interengagement between the tongue 50 and the slot 52 provide the connection between the record changer and the pivot bracket 30 for pivotally mounting the record changer to the upright frame 14.

In order to remove the record changer 12 from its pivotally mounted position between the upright frame members 14, and referring to FIG. 3, the record changer is rotated to its horizontal position, as seen in phantom in FIG. 3, and the record changer is maneuvered to move the tongue 50 out of the slot 52 in the direction of arrows A. The leg portion 38*a* of the upright frame member 14 has a cut-out recess or notch 56 through which the connecting bracket 48 can pass to permit removal of the record changer 12 and the connecting brackets 48 secured thereto from between the upright frame members 14. Conversely, to position the record changer pivotally between the upright frame members 14, the record changer is maneuvered in a direction opposite that of arrows A. To aid in positioning the record changer between the upright frame members, the pivot bracket 30 is provided with a curved camming surface 58 (FIG. 3) along which the tongue 50 of the connecting bracket 48 may slide to guide the tongue into the mouth of the slot 52.

In order to prevent removal of the record changer 12 except when in its horizontal position and referring to FIG. 2, it can be seen that the slot 52 is oriented, when the record changer is in the vertical position, such that the tongue 50 cannot be moved out of the slot because the tongue will be blocked by the interior wall of the leg portion 38*b* of the upright frame member 14. Therefore, it can be seen that the orientation of the hinge components in relation to the upright frame members prevents removal of the record changer except when in the horizontal position shown in FIG. 3 wherein the connecting bracket 48 can be moved through the notch 56 in the leg portion 38*a* of the upright frame member. The upright frame members 14 each have parallel wall portions 60*a*, 60*b* extending between the legs 38*a*, 38*b* to form an inwardly opening box within which the hinge components are housed, to wall portion 60*a* and the leg portion 38*b* preventing removal of the connecting bracket (along with the record changer 12) in any position except the horizontal position shown in FIG. 3. A boss 61 prevents lateral movement of the connecting bracket 48 toward the notch 56 should the tongue 50 be moved out of the open-ended slot 52 toward the area where the leg portion 38*b* of the upright frame member joins the wall portion 60*a*, when the record changer is in its vertical position.

Means are provided to slow the pivoting movement of the record changer between its vertical and horizontal positions and thereby prevent jolting of the record changer. This means comprises a pair of nylon washers 62 (FIG. 4) positioned about the screw 44, with one washer on each side of the flat plate portion 40 of the pivot bracket 30. A circular nut 64 is threaded onto the inner end of the screw 44 to clamp the washers against the plate portion 40 of the pivot bracket 30. The nut 64 is prevented from rotation by a boss 66 which extends between a pair of ribs 68 (FIG. 3) formed on the frame leg portion 38*a* of the frame member 14. It can be seen that the amount of force used to clamp the two nylon washers against the plate portion 40 controls by friction the resistance on the pivoting movement of the bracket 30 and thereby controls and/or cushions the movement of the record changer 14 between its vertical and horizontal positions.

The foregoing detailed description has been given for clearness of understanding only and no unnecessary limitations should be understood therefrom as some modifications will be obvious to those skilled in the art.

I claim:

1. A phonograph having a hinge structure permitting a tray member to be pivoted between storage and playing positions relative to a frame member comprising: a pivot bracket pivotally secured to one of said members; a connecting bracket secured to the other of said members in a position for cooperating with said pivot bracket; means on the pivot bracket for removably receiving said connecting bracket to permit said connecting bracket and said other member to be pivoted with said pivot bracket relative to said one member between said storage and playing positions; and means preventing removal of said connecting bracket from said pivot bracket unless said tray member is in its playing position.

2. The phonograph of claim 1 wherein said tray member is pivoted to an upright frame member, said hinge permitting said tray member to be pivoted between horizontal and vertical positions and said last-named means preventing removal of the tray member from the upright frame member unless the tray member is in its horizontal position.

3. The phonograph of claim 1 wherein one of said brackets includes an open-ended slot formed therein and the other of said brackets includes a complementary tongue insertable in and removable from a mouth at one end of said slot.

4. The phonograph of claim 3 wherein one of said members has means blocking the mouth of said slot in the storage position of said tray member and exposing the mouth of said slot in the playing position of the tray member to permit removal of the tray member from the upright frame member in only the playing position of the tray member.

5. The phonograph of claim 4 including means defining a cam surface on said pivot bracket for guiding said tongue toward the mouth of said slot to facilitate easy insertion of the tongue into the slot.

6. The phonograph of claim 1 including an adjustable friction clamp means mounted on said one member and frictionally clamping said pivot bracket to slow the movement of said tray member and thereby prevent jolting the tray member on movement between said positions.

7. A phonograph construction, including a pair of spaced upright frame members, a record changer disposed between the upright frame members and pivotally mounted thereto, each of said frame members having an inwardly facing channel-shaped portion adjacent the area of pivotally mounting said record changer thereto, said channel-shaped portions each having two parallel leg portions joined by a bight portion, a pivot bracket pivotally secured to the bight portion of said upright frame members and disposed wholly within said channel-shaped portions, a pair of connecting brackets secured one to each of opposite sides of said record changer in position for cooperating with said pivot brackets, means on the pivot brackets for removably receiving said connecting brackets to permit said connecting brackets and said record changer to be pivoted with said pivot brackets relative to said upright frame members between horizontal and vertical positions, wall means on said frame members preventing removal of said connecting brackets from said pivot brackets unless said record changer is in its horizontal position, and a recess in one of the legs of said channel-shaped portions permitting said connecting brackets to be moved therethrough when said record changer is in its horizontal position.

8. The phonograph structure of claim 7 wherein one of said brackets on each side of said record changer includes a slot formed therein and the other of said brackets includes a complementary tongue insertable in and removable from a mouth at one end of said slot, said tongue being movable through the recess in said one leg.

9. The phonograph structure of claim 8 wherein said wall means blocks the mouth of said slot except when said record changer is in its horizontal position.

10. The phonograph structure of claim 9 including means defining a cam surface on said pivot bracket for guiding said tongue toward the mouth of said slot to facilitate easy insertion of the tongue into the slot.

11. The phonograph structure of claim 7 including an adjustable friction clamp means mounted on said bight portion and frictionally clamping said pivot bracket to slow the movement of said record changer and thereby prevent jolting the record changer.

References Cited

UNITED STATES PATENTS

| | | | |
|---|---|---|---|
| 2,334,951 | 11/1943 | Parke et al. | 16—171 |
| 2,790,992 | 5/1957 | Campbell | 16—171 |
| 3,049,748 | 8/1962 | Gehrie | 16—171 |
| 3,141,577 | 7/1964 | Watson | 248—133 |
| 3,196,480 | 7/1965 | Whittom | 312—8 |
| 3,352,613 | 11/1967 | Morris et al. | 312—8 |
| 3,409,339 | 11/1968 | Gehrung et al. | 312—8 |

FRANCIS K. ZUGEL, Primary Examiner

U.S. Cl. X.R.

248—137; 16—171